(12) United States Patent
Xiang et al.

(10) Patent No.: US 7,863,145 B2
(45) Date of Patent: Jan. 4, 2011

(54) METHOD AND RESULTING STRUCTURE USING SILVER FOR LCOS DEVICES

(75) Inventors: Yanghui Oliver Xiang, Shanghai (CN); Enlian Lu, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 77 days.

(21) Appl. No.: 12/234,382

(22) Filed: Sep. 19, 2008

(65) Prior Publication Data

US 2010/0072481 A1 Mar. 25, 2010

(51) Int. Cl.
*H01L 21/8238* (2006.01)
*H01L 21/336* (2006.01)
*H01L 21/331* (2006.01)
*H01L 21/76* (2006.01)

(52) U.S. Cl. .................. 438/297; 438/225; 438/439; 438/362

(58) Field of Classification Search .............. 438/72, 438/102, 60, 29, 225, 297, 362, 439
See application file for complete search history.

(56) References Cited

U.S. PATENT DOCUMENTS

2004/0036824 A1 * 2/2004 Lee ........................ 349/113
2005/0164470 A1 * 7/2005 Yamazaki et al. .......... 438/455

\* cited by examiner

*Primary Examiner*—Chuong A. Luu
(74) *Attorney, Agent, or Firm*—Townsend and Townsend and Crew LLP

(57) ABSTRACT

A method for fabricating an LCOS device. The method includes providing a semiconductor substrate and forming a plurality of MOS transistor devices formed on a portion of the semiconductor substrate. The method includes forming a first dielectric layer overlying the plurality of transistor devices and forming a first metal layer overlying the first dielectric layer. The method includes forming a second dielectric layer overlying the first metal layer and forming a plurality of pixel regions made substantially of silver bearing material overlying the second dielectric layer. In a preferred embodiment, the silver bearing material has much higher reflectivity for wavelengths of 450 nanometers and greater.

19 Claims, 3 Drawing Sheets

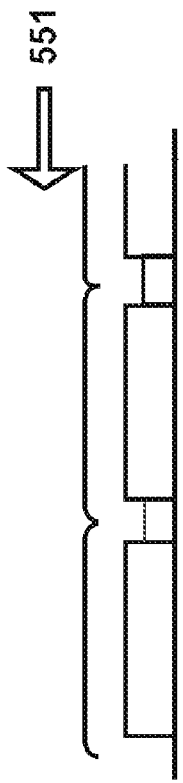
FIGURE 5
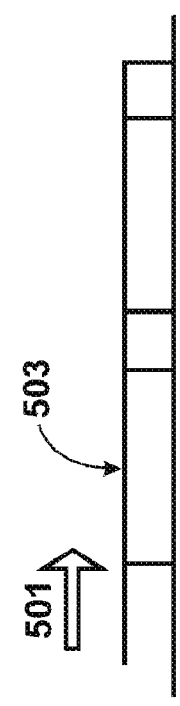
FIGURE 6
FIGURE 7

METHOD AND RESULTING STRUCTURE USING SILVER FOR LCOS DEVICES

BACKGROUND OF THE INVENTION

The present invention is directed to integrated circuits and their processing for the manufacture of electronic devices. More particularly, the invention provides a method for manufacturing an electrode structure for a liquid crystal on silicon ("LCOS") device for displays. But it would be recognized that the invention has a much broader range of applicability.

Electronic display technologies have rapidly developed over the years. From the early days, cathode ray tube technology, commonly called CRTs, outputted selected pixel elements onto a glass screen in conventional television sets. These television sets originally output black and white moving pictures. Color television sets soon replaced most if not all black and white television units. Although very successful, CRTs were often bulky, difficult to make larger, and had other limitations.

CRTs were soon replaced, at least in part, with liquid crystal panel displays. These liquid crystal panel displays commonly called LCDs used an array of transistor elements coupled to a liquid crystal material and color filter to output moving pictures in color. Many computer terminals and smaller display devices often relied upon LCDs to output video, text, and other visual features. Unfortunately, liquid crystal panels often had low yields and were difficult to scale up to larger sizes. These LCDs were often unsuitable for larger displays often required for television sets and the like.

Accordingly, projection display units have been developed. These projection display units include, among others, a counterpart liquid crystal display, which outputs light from selected pixel elements through a lens to a larger display to create moving pictures, text, and other visual images. Another technology is called "Digital Light Processing" (DLP), which is a commercial name from Texas Instruments Incorporated (TI) of Texas, USA. DLP is often referred to as the use of "micro-mirrors." DLP relies upon a few hundred thousand tiny mirrors, which line up in 800 rows of 600 mirrors each. Each of the mirrors is hinged. An actuator is attached to each of the hinges. The actuator is often electrostatic energy that can tilt each of the mirrors at high frequency. The moving mirrors can modulate light, which can be transmitted through a lens and then displayed on a screen. Although DLP has been successful, it is often difficult to manufacture and subject to low yields, etc.

Yet another technique is called LCOS. LCOS uses liquid crystals applied to a reflective mirror substrate. As the liquid crystals "open" or "close," light is reflected or blocked, which modulates the light to create an image for display. Compared to the conventional transmissive LCD, a reflective LCOS display allows more light to be passed through the optics and therefore it provides a higher luminance. Often times, there are at least three LCOS chips, each corresponding to light in red, green, and blue channels. LCOS, however, has many limitations. As merely an example, LCOS is often difficult to manufacture. Additionally, LCOS requires at least the three chips that make the projector bulky and heavy and leads to high costs.

Conventional LCOS also uses aluminum material as a reflective film for electrodes. A conventional method to smooth the aluminum/oxide is chemical mechanical planarization, commonly called the Al CMP processes. CMP process, however, causes many undesirable issues, such as dishing, micro-scratching, and oxidation of the aluminum surfaces. These and other limitations are described in greater detail below.

From the above, it is seen that an improved technique for processing devices is desired.

BRIEF SUMMARY OF THE INVENTION

According to the present invention, techniques for processing integrated circuits for the manufacture of electronic devices are provided. More particularly, the invention provides a method for manufacturing an electrode structure for a liquid crystal on silicon ("LCOS") device for displays. But it would be recognized that the invention has a much broader range of applicability.

In a specific embodiment, the present invention provides a method for fabricating an LCOS device using a chemical mechanical polishing of mirror structures. The method includes providing a semiconductor substrate, e.g., silicon wafer. The method includes forming a first dielectric layer overlying the semiconductor substrate and forming an silver metal layer overlying the dielectric layer. In a preferred embodiment, the silver metal layer has an upper surface with a predetermined roughness measured in root mean squared ("RMS"). The method patterns the silver metal layer to expose portions of the dielectric layer. The exposed portions forming borders surrounds one of a plurality of patterns of the patterned silver metal layer. In a preferred embodiment, the one of the plurality of patterns corresponds to a pixel element. The method includes forming a second dielectric layer overlying the silver metal layer and exposed portions of the dielectric layer. The method removes a portion of the second dielectric layer to a region within a vicinity of the upper surface of the patterned silver metal layer and processes regions overlying the patterned silver metal layer using a polishing process to reduce a surface roughness of the upper surface of the patterned silver metal layer to less than 5 Angstroms to form a mirror surface on the upper surface of the patterned silver metal layer. In a preferred embodiment, the mirror surface corresponds to the pixel element.

In an alternative specific embodiment, the present invention provides a method for fabricating an LCOS device. The method includes providing a semiconductor substrate and forming a plurality of MOS transistor devices formed on a portion of the semiconductor substrate. The method includes forming a first dielectric layer overlying the plurality of transistor devices and forming a first metal layer overlying the first dielectric layer. The method includes forming a second dielectric layer overlying the first metal layer and forming a plurality of pixel regions made substantially of silver bearing material overlying the second dielectric layer. In a preferred embodiment, the silver bearing material has much higher reflectivity for wavelengths of 450 nanometers and greater.

In yet an alternative specific embodiment, the present invention provides an LCOS device. The device has a semiconductor substrate, e.g., silicon wafer. The device has a plurality of MOS transistor devices formed on a portion of the semiconductor substrate and a first dielectric layer overlying the plurality of transistor devices. The device includes a first metal layer overlying the first dielectric layer and a second dielectric layer overlying the first metal layer. The device has a plurality of pixel regions made substantially of silver bearing material overlying the second dielectric layer.

Many benefits are achieved by way of the present invention over conventional techniques. For example, the present technique provides an easy to use process that relies upon conventional technology. In some embodiments, the method provides higher device yields in dies per wafer. Additionally, the method provides a process that is compatible with conventional process technology without substantial modifications to conventional equipment and processes. Preferably, the invention provides for an improved mirror or electrode structure for LCOS devices used for displays. Such electrode structure uses a highly reflective silver material that provides an improved mirror surface. In a preferred embodiment, the reflectivity is increased by about 5 percent and greater as compared to conventional aluminum bearing techniques. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 2 through 7 are simplified cross-sectional view diagrams illustrating methods for fabricating an LCOS device according to embodiments of the present invention.

DETAILED DESCRIPTION OF THE INVENTION

According to the present invention, techniques for processing integrated circuits for the manufacture of electronic devices are provided. More particularly, the invention provides a method for manufacturing an electrode structure for a liquid crystal on silicon ("LCOS") device for displays. But it would be recognized that the invention has a much broader range of applicability.

Figure 1:
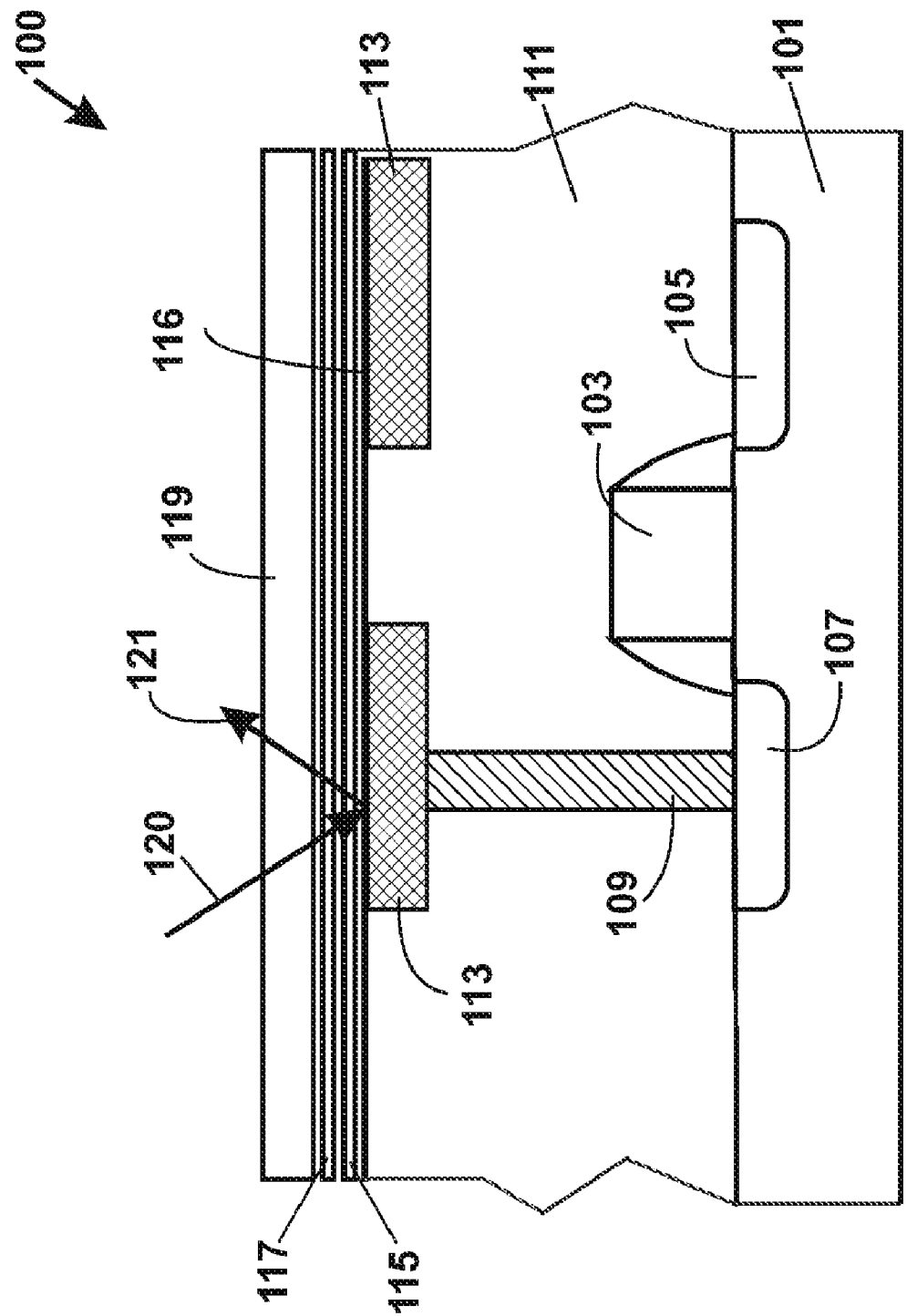
FIG. 1 is a simplified cross-sectional view diagram of an LCOS device according to an embodiment of the present invention.

FIG. 1 is a simplified cross-sectional view diagram of an LCOS device 100 according to an embodiment of the present invention. This diagram is merely an example, which should not unduly limit the scope of the claims herein. One of ordinary skill in the art would recognize many variations, alternatives, and modifications. As shown, the LCOS device 100 has a semiconductor substrate 101, e.g., silicon wafer. An MOS device layer 103 is formed overlying the semiconductor substrate. Preferably, the MOS device layer has a plurality of MOS devices. Each of the MOS devices has a contact region 107 for an electrode and a contact region 105 for a voltage potential. A planarized interlayer dielectric layer 111 is formed overlying the MOS device layer. The LCOS device also has a plurality of recessed regions within a portion of the interlayer dielectric layer and a metal layer to fill each of the recessed regions to form respective plurality of electrode regions 113 corresponding to each of the recessed regions. In a preferred embodiment, the metal layer is a silver bearing material and/or silver layer or layers. Each of the electrode regions is respectively coupled to at least one of the MOS devices among the plurality of MOS devices via interconnect structure 109, which may be a plug or other like structure. A protective layer is formed overlying surface regions of each of the plurality of electrode regions to protect the surface regions. A mirror finish 116 is on each of the surface regions. Preferably, the mirror finish is substantially free from dishes and scratches from a chemical mechanical polishing process. More preferably, the chemical mechanical polishing process is a touch polishing process with certain conditions. Each of the electrodes may have a thickness ranging from about 2000 Angstroms to about 4000 Angstroms and can be at other dimensions. Each of the electrodes represents a pixel element in an array of pixel elements for the LCOS device. Also shown are liquid crystal film 115 overlying the electrodes. The LCOS device also has a transparent electrode layer (e.g., indium tin oxide) 117 and an overlying glass plate 119 to enclose the multilayered structure. Details on ways of operating the LCOS device can be found throughout the present specification and more particularly below.

To operate the LCOS device, light 120 traverses through the glass cover, through the transparent electrode, and to the liquid crystal film. When the electrode is not biased, the liquid crystal film is essentially in the off position, which does not allow the light to pass therethrough. Rather, light is blocked and does not reflect off of the mirror surface of the electrode. When the electrode is biased via MOS device, the liquid crystal film is in an on-position, which allows light to pass 121. The light reflects off of the surface of the electrode and through the liquid crystal film, which is in an on-position. Preferably, the mirror surface is substantially free from imperfections. Accordingly, at least 97% of the incoming light passes out 121 of the LCOS device according to certain embodiments. Details on ways of fabricating the LCOS device can be found throughout the present specification and more particularly below.

A method for fabricating an electrode structure for an LCOS device according to an embodiment of the present invention may be outlined as follows:

1. Provide a substrate;
2. Form a layer of transistor elements overlying the substrate;
3. Form a first interlayer dielectric layer overlying the layer of transistor elements;
4. Form barrier metal layer overlying the first interlayer dielectric layer;
5. Form a silver layer overlying barrier metal layer on the first interlayer dielectric layer;
6. Mask the silver layer;
7. Pattern the silver layer to form a plurality of electrode regions, each of the electrode regions corresponding to a pixel element;
8. Form border regions surrounding each of the pixel elements using exposed regions of the first interlayer dielectric layer;
9. Form a second dielectric layer overlying each of the pixel elements and exposed regions of the first interlayer dielectric layer;
10. Perform a chemical mechanical planarization process overlying the second dielectric layer to reduce a thickness of the second dielectric layer;
11. Continue to reduce the thickness of the second dielectric layer until a surface region of each of the electrode regions is exposed;
12. Optionally, touch polishing the surface region of each of the electrode regions using the chemical mechanical planarization process to reduce a surface roughness of the surface region from a first predetermined level to a second predetermined level; and
13. Form a protective layer overlying surface regions of the patterned silver layer;
14. Provide a liquid crystal layer overlying the protective layer, a transparent electrode layer overlying the liquid crystal layer, and a glass layer overlying the transparent electrode layer to form the LCOS device; and
15. Perform other steps, as desired.

The above sequence of steps provides a method according to an embodiment of the present invention. As shown, the method uses a combination of steps including a way of forming an electrode structure using a silver bearing material for an LCOS device. Other alternatives can also be provided where steps are added, one or more steps are removed, or one or more steps are provided in a different sequence without departing from the scope of the claims herein. Further details of the present method can be found throughout the present specification and more particularly below.

Figure 2:
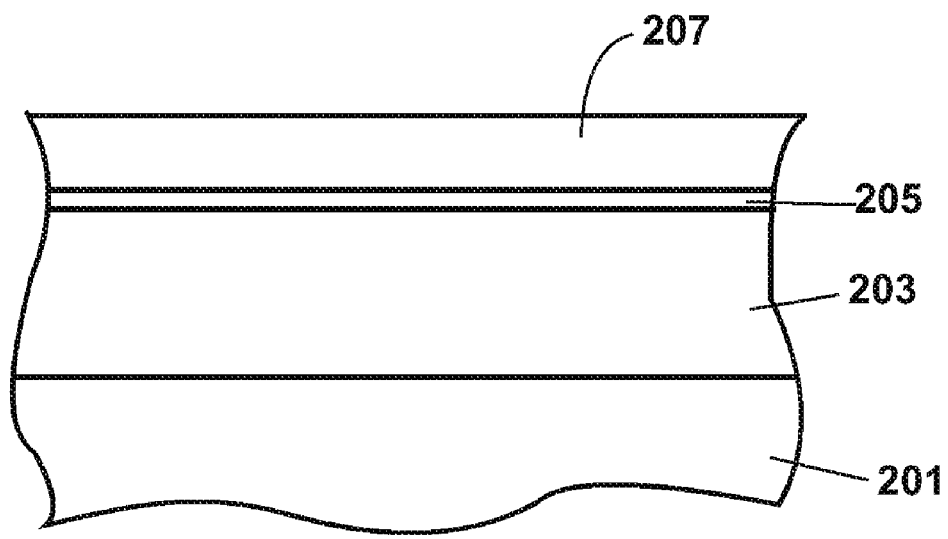

FIGS. 2 through 7 illustrate a method for forming an LCOS device according to an embodiment of the present invention. These diagrams are merely examples, which should not unduly limit the scope of the claims herein. One of ordinary skill in the art would recognize many variations, alternatives, and modifications. Referring to FIG. 2, the method begins by providing a semiconductor substrate 201, e.g., silicon wafer. The method includes forming a transistor layer overlying the substrate. Preferably, the transistor layer has a plurality of MOS devices, each of which includes a first contact region and a second contact region. The method also includes forming an interlayer dielectric layer 203 overlying the transistor layer. The dielectric layer can be made of BPSG, FSG, oxide, any combination of these, and the like. Preferably, the dielectric layer is formed using a chemical vapor deposition process. The method then planarizes the interlayer dielectric layer to form a planarized surface region. Optionally, the dielectric layer has already been planarized.

Referring again to FIG. 2, the method includes forming a barrier metal layer 205 overlying the planarized surface region of the planarized interlayer dielectric layer. The barrier metal layer can be made from any suitable material such as titanium nitride, titanium/titanium nitride, and the like. The method includes forming a silver bearing metal layer 207 overlying the barrier metal layer. The silver bearing metal layer is sputtered or deposited using chemical vapor deposition or electro plated or any combination of these techniques, and the like. In a preferred embodiment, the silver material is electro plated using a silver source and electrode configuration. The electro plating can be performed at a low temperature and be maintained at about room temperature (e.g. 12-29 degrees Celsius) and less in a preferred embodiment.

The metal layer has a surface that is substantially planar but may certain defects such as surface roughness and other imperfections, which may be removed using a polishing process. Each of the electrode regions is respectively coupled to each of the MOS devices among the plurality of MOS devices.

Figure 3:
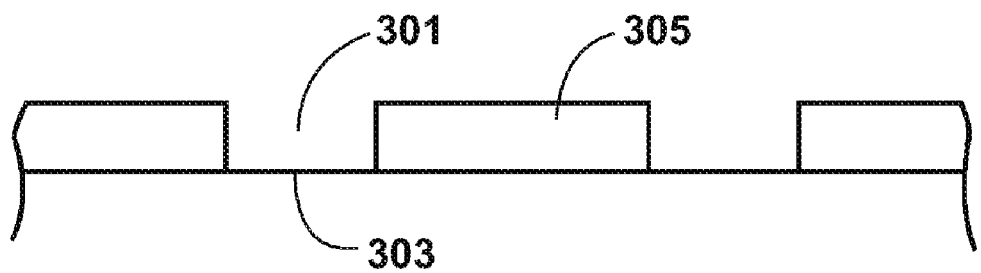

Referring to FIG. 3, the method includes masking the upper surface of the silver metal layer. The mask is patterned to expose certain regions of the silver metal layer. The method patterns the silver metal layer to form a plurality of electrode 305 regions. Each of the electrode regions corresponds to a pixel element. The method forms border regions 301 surrounding each of the pixel elements using exposed regions 303 of the interlayer dielectric layer. Each of pixel elements has a width of about 5 um to about 15 um, and a thickness of about 500~5000 A. Of course, one of ordinary skill in the art would recognize other variations, modifications, and alternatives.

Figure 4:
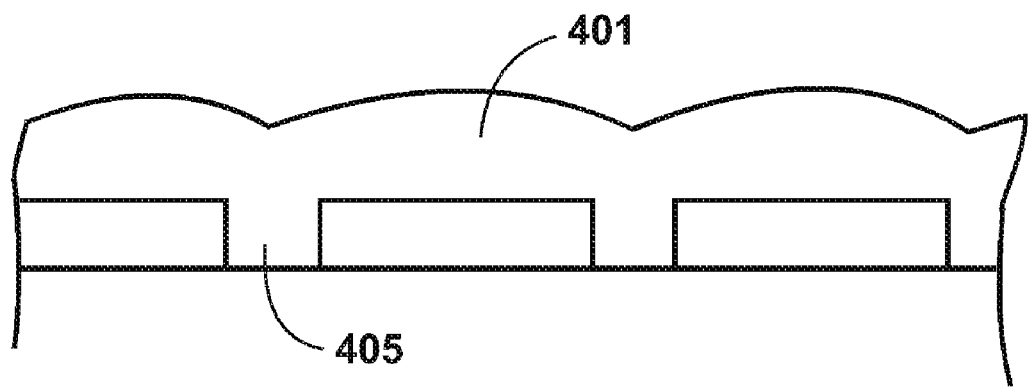

According to a specific embodiment, the method forms a second dielectric layer 401 overlying each of the pixel elements and exposed regions of the first interlayer dielectric layer, as illustrated by the simplified diagram of FIG. 4. the second dielectric can be any suitable material or materials. That is, the dielectric layer can be made of BPSG, FSG, oxide, any combination of these, and the like. Preferably, the dielectric layer is formed using a chemical vapor deposition process.

The method then performs a chemical mechanical planarization process 501 overlying the second dielectric layer to reduce a thickness of the second dielectric layer, as illustrated by FIG. 5. The method continues to reduce the thickness of the second dielectric layer until a surface region of each of the electrode regions 503 is exposed. Preferably, the method touch polishes the surface region of each of the electrode regions using the chemical mechanical planarization process to reduce a surface roughness of the surface region from a first predetermined level to a second predetermined level.

Depending upon the application, the touch polishing operation for silver metal can be conducted with suitable parameters. In a specific embodiment, the touch polishing process can be provided on a chemical mechanical polishing tool such as EPO-222 manufactured by Ebara, but can be others. The touch polishing is characterized by applying a polishing head rotating at a head speed of 20 to 40 RPM. The touch polishing process comprises applying a polishing head comprising a soft pad such as those called Polytex manufactured by Rodel onto the regions overlying the patterned silver metal layer. Preferably, the touch polishing process uses selected slurry mixtures. According to a specific embodiment, the resulting mirror surface is characterized by a reflectivity of 97 percent and greater for light having a wave length of 500 nanometers and greater. Of course, there can be other alternatives, variations, and modifications. Optionally, the method performs a combination of chemical mechanical planarization, etch back, and touch polishing, as illustrated by FIGS. 5, 6, and 7. The method performs and oxide chemical mechanical planarization process 551. Of course, there can be other variations, modifications, and alternatives.

The method performs an etch back process 601, as illustrated by FIG. 6. The etch back process can be dry or wet or a combination of these. The etch back process relies upon a suitable etching recipe. The etch back process occurs until the upper surface of the patterned aluminum layer has been exposed. The method then performs a touch polishing process 701, as illustrated by FIG. 7. In a specific embodiment, the touch polishing process can be provided on a chemical mechanical polishing tool such as EPO-222 manufactured by Ebara, but can be others. The touch polishing is characterized by applying a polishing head rotating at a head speed of 20 to 40 RPM. The touch polishing process comprises applying a polishing head comprising a soft pad such as those called Polytex manufactured by Rodel onto the regions overlying the patterned aluminum layer. Preferably, the touch polishing process uses selected slurry mixtures. According to a specific embodiment, the resulting mirror surface is characterized by a reflectivity of 97 percent and greater for light having wavelengths of 500 nanometers and greater. Of course, there can be other alternatives, variations, and modifications.

The method also includes forming a protective layer overlying surface regions of each of the plurality of electrode regions to protect the surface regions having a mirror finish for each of the electrode regions. Preferably, at least 95% of the light is reflected back from the mirror finish in completed LCOS devices. Alternatively, the silver material is maintained in a substantially inert processing environment before a liquid crystal material is formed thereon to prevent any oxidation of the silver bearing material. In a specific embodiment, the inert processing environment is substantially nitrogen gas, or any other non-reactive species. Depending upon the embodiment, there can be other variations, modifications, and alternatives.

To complete the LCOS device, the method forms a sandwiched layer having liquid crystal materials. Here, a liquid crystal film is formed overlying the electrodes. A transparent electrode structure is formed overlying the liquid crystal film. The method forms a glass plate overlying the transparent electrode. The sandwiched structure is often formed as an assembly, which is later disposed onto surfaces of the electrodes of the LCOS devices. Of course, one of ordinary skill in the art would recognize many variations, alternatives, and modifications.

EXAMPLES

To prove the principles and operation of the present invention, we performed various experiments. These experiments are merely examples, which should not unduly limit the scope of the claims herein. One of ordinary skill in the art would recognize many variations, modifications, and alternatives. As will be shown below, we have provided this experiment to illustrate certain aspects of our invention. Silver electroplating was chosen to demonstrate as the deposition method mainly because electroplating is characterized by a low-temperature and is often a low-cost process. Silicon wafers were used in the experiment and coated with about 1200 Å copper film using physical vapor deposition. Certain segments of these wafers were electroplated with silver. Different plating formula and parameters were evaluated in order to obtain desired film properties. The reflectivity for the segments was measured on a Perkin Elmer Lambda 900 spectrometer over the wavelength range of 400-800 nm.

In this example, the reflectivity achieved at 400 nm is about 89%, which is a little lower than aluminum. However, reflectivity of silver increases rapidly with increasing wavelength. The reflectivity reaches 95% at 450 nm and exceeds 97% when the wavelength is above 500 nm. The data showed substantially higher overall reflectivity than aluminum film according to the experiment. The electroplated silver film can then be polished in order to planarize and improve the reflectivity and form the desired pattern.

Although electroplating has been used, physical vapor deposition (PVD) or chemical vapor deposition (CVD) can also be used to deposit silver film. Integration can use either subtractive or damascene scheme and the detailed process integration will be described in a separate disclosure. It should also be pointed out that silver has a strong tendency to oxidize and tarnish as a result of the reaction with sulfur. Therefore, the finished silver film should be thoroughly sealed from the atmosphere to avoid degradation.

Although the above has been described in terms of a damascene process, there can be other variations, modifications, and alternatives. As an example, the process can be a conventional lithography technique free from chemical mechanical polishing. Additionally, It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for fabricating an LCOS device using a chemical mechanical polishing of mirror structures, the method comprising:
   providing a semiconductor substrate;
   forming a first dielectric layer overlying the semiconductor substrate;
   forming an silver metal layer overlying the dielectric layer, the silver metal layer having an upper surface with a predetermined roughness measured in RMS;
   patterning the silver metal layer to expose portions of the dielectric layer, the exposed portions forming borders surrounding one of a plurality of patterns of the patterned silver metal layer, the one of the plurality of patterns corresponding to a pixel element;
   forming a second dielectric layer overlying the silver metal layer and exposed portions of the dielectric layer;
   removing a portion of the second dielectric layer to a region within a vicinity of the upper surface of the patterned silver metal layer; and
   processing regions overlying the patterned silver metal layer using a polishing process to reduce a surface roughness of the upper surface of the patterned silver metal year to less than 5 Angstroms to form a mirror surface on the upper surface of the patterned silver metal layer, the mirror surface corresponding to the pixel element.

2. The method of claim 1 wherein the first dielectric layer is a single layer or multiple layers.

3. The method of claim 1 wherein the second dielectric layer is a single layer or multiple layers.

4. The method of claim 1 wherein the forming of the silver metal layer comprises an electro plating process.

5. The method of claim 4 wherein the electro plating process is maintained at a temperature in a range from about 12 degrees Celcius to about 29 degrees Celsius.

6. The method of claim 1 wherein the mirror surface is characterized by a reflectivity of 97% and greater for visible light having wavelengths of about 500 nanometers and greater.

7. The method of claim 1 wherein the mirror surface is characterized by a reflectivity of 95% and greater for visible light having wavelengths of about 450 nanometers and greater.

8. The method of claim 1 wherein the mirror surface is characterized by a reflectivity of about 89% for visible light having a wavelength of about 400 nanometers.

9. The method of claim 1 further comprising maintaining the mirror surface in an inert environment.

10. The method of claim 9 wherein the inert environment comprises substantially nitrogen gas.

11. A method for fabricating an LCOS device, the method comprising:
    providing a semiconductor substrate;
    forming a plurality of MOS transistor devices formed on a portion of the semiconductor substrate;
    forming a first dielectric layer overlying the plurality of transistor devices;
    forming a first metal layer overlying the first dielectric layer;
    forming a second dielectric layer overlying the first metal layer; and
    forming a plurality of pixel regions made substantially of silver bearing material overlying the second dielectric layer, wherein the pixel regions have a thickness ranging from about 2000 Angstroms to about 4000 Angstroms.

12. The method of claim 11 wherein the pixels regions are provided by an electroplating process.

13. The method of claim 11 wherein the pixels regions are provided using a PVD or CVD process.

14. The method of claim 11 wherein each of the pixels regions has a surface reflectivity of greater than 97% for a visible light having a wavelength of 500 nanometers and greater.

15. The method of claim 11 wherein the plurality of pixels regions are provided using a dual damascene process.

16. The method of claim 11 wherein each of the pixels regions is maintained in an inert environment.

17. The method of claim 11 further comprising:
forming a protective layer overlaying the plurality of pixel regions to maintain the silver bearing material free from any oxidation.

18. The method of claim 16 further comprising:
forming a liquid crystal layer overlying the protective layer.

19. The method of claim 17 further comprising:
forming a transparent electrode layer overlying the liquid crystal layer, and forming a glass layer overlying the transparent electrode layer.

* * * * *